July 5, 1960 H. SCHMIDT, JR 2,943,738
FILTRATION APPARATUS
Filed June 6, 1958 3 Sheets-Sheet 1
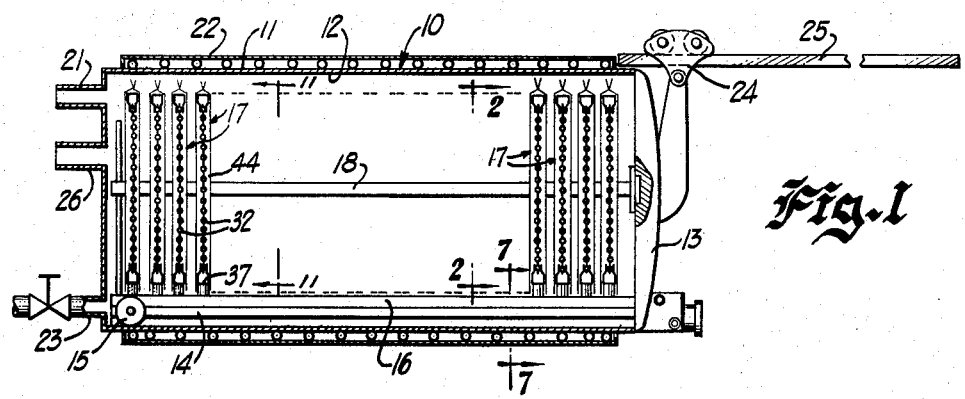
Fig.1
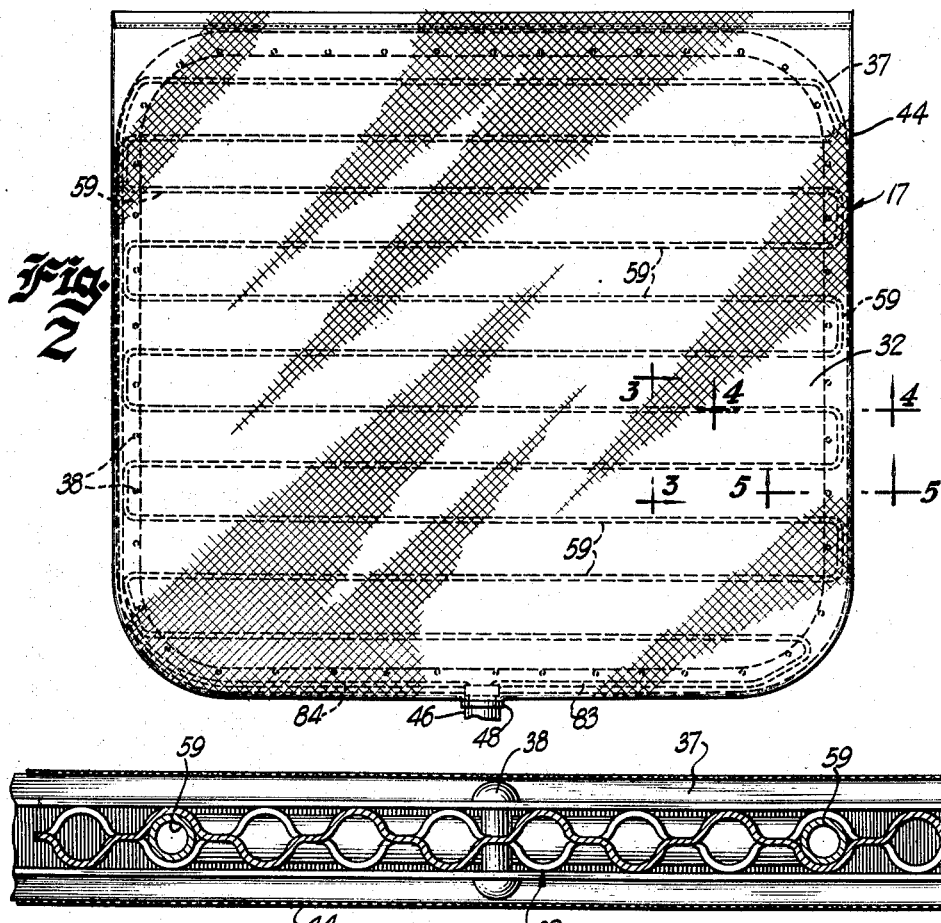
Fig.2
Fig.3
INVENTOR.
Henry Schmidt, Jr.
BY
Mason, Kolehmainen, Rathburn and Wyss
Attorneys.

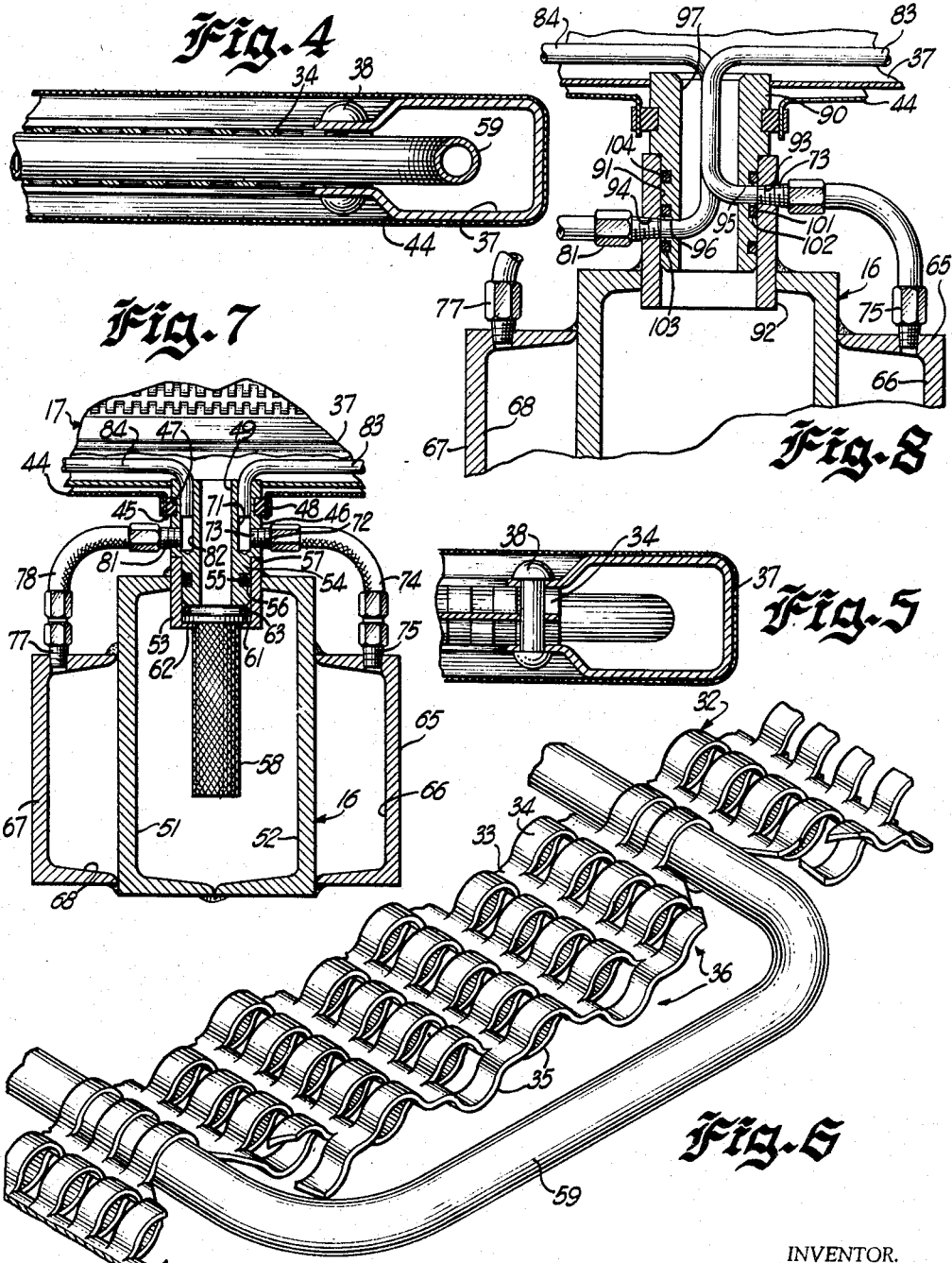

July 5, 1960　　　　H. SCHMIDT, JR　　　2,943,738
FILTRATION APPARATUS

Filed June 6, 1958　　　　　　　　　　3 Sheets-Sheet 3

INVENTOR.
Henry Schmidt, Jr.
BY
Fidler, Boardsley and Boardley
Attorneys

United States Patent Office 2,943,738
Patented July 5, 1960

2,943,738

FILTRATION APPARATUS

Henry Schmidt, Jr., Hinsdale, Ill., assignor to Industrial Filter & Pump Mfg. Co., Chicago, Ill., a corporation of Illinois Filed June 6, 1958, Ser. No. 740,237

12 Claims. (Cl. 210—185)

The present invention relates to filtration apparatus and more particularly to a new and improved filter leaf including means for controlling the temperature of the leaf.

Vegetable oils, as produced in nature, include a certain amount of stearin which must be removed from the oils if they are to be best suited for domestic purposes. In accordance with present-day practices, the stearin is removed from vegetable oil by subjecting the natural oil to a winterizing process in which the temperature of the oil is maintained at approximately 55° F. so that the stearin, but not the oil, congeals or solidifies. With the stearin thus separated from the oil, the mixture is passed through a porous filter which traps the stearin on the surface thereof while permitting the purified oil to pass therethrough. Since stearin is a fat which in this chilled condition is relatively solid, it builds up a cake on the outer surface of the porous filter element and impedes the flow of oil through the filter element. Accordingly, when the cake has become sufficiently thick so as to reduce the efficiency of operation of the filter below a predetermined level, it is necessary to remove the stearin from the filter element. To do this, the flow of oil through the filter is terminated, the filter cake is cleaned of oil, the chamber is drained, and the stearin is removed from the filter element.

The stearin may be removed from the filter element in a number of ways, such as by the use of scrapers, but since the filter elements are relatively fragile and may be damaged by scraping, it would be desirable to provide an improved method and apparatus for removing the stearin filter cake from a filter element. This may be accomplished by placing a suitable container beneath the filter element and raising the temperature of the stearin to a value above its melting point so that as the stearin melts it drips from the leaves into the container. This heating of the stearin may be accomplished by employing a filter leaf which includes means for raising the temperature thereof to a relatively high value. However, after the stearin has been removed in this manner from a filter leaf, the leaf may be quite hot and in order to minimize the shut-down time of the filter should be pre-cooled before again being connected into the system. This is important to prevent a hot filter leaf from initially heating the vegetable oil as it comes in contact therewith, which might cause some of the congealed stearin to melt and thus pass through the filter element.

Although the above described winterizing process is extremely effective for removing stearin from vegetable oil, it requires the use of relatively expensive filters, the cost of these filters being to a large extent determined by the cost of the filter elements which are necessarily used therein. Therefore, a principal object of the present invention is to provide a new and improved winterizing method and apparatus for removing stearin from vegetable oil.

Another object of the present invention is to provide a new and improved filter leaf for use in a filter adapted for the removal of stearin from vegetable oils.

A further object of the present invention is to provide a new and improved filter leaf including means for controlling the temperature thereof.

Another object of the present invention is to provide a new and improved core for use in a temperature-controlled hollow filter leaf.

Briefly, the above and further objects are realized in accordance with the present invention by providing a filter which includes as its principal components a plurality of hollow filter leaves, each leaf comprising a central self-supporting core which includes a plurality of integral, upset loops forming flutes in which is supported a tubular, heat conducting member through which a temperature-controlling fluid may be passed. The porous material on which a filter cake is formed is constituted by a fabric bag which covers the core. Preferably, the core is a tubularly slit metallic screen, and the flutes therein serve to provide a spacer between the opposing sides of the bag and further function to provide grooves on the surface of the core through which the effluent oil may pass to an outlet manifold.

The invention, both as to its organization and method of operation, together with further objects and advantages thereof, will best be understood by reference to the following detailed description taken in connection with the accompanying drawings, in which:

Fig. 1 is a schematic, elevational view of a multiple leaf filter embodying the present invention, the filter being partially shown in section;

Fig. 2 is a side elevational view, with certain portions removed, of a temperature-controlled filter leaf embodying certain aspects of the present invention;

Fig. 3 is a fragmentary sectional view taken along the line 3—3 of Fig. 2;

Fig. 4 is a fragmentary sectional view taken along the line 4—4 of Fig. 2;

Fig. 5 is a fragmentary sectional view taken along the line 5—5 of Fig. 2;

Fig. 6 is a perspective view of a portion of the core of the filter leaf of Fig. 2;

Fig. 7 is a fragmentary sectional view showing the connection between a filter leaf such as shown in Fig. 2 and associated inlet and outlet ducts; and Fig. 8 is a sectional view of an alternative connecting arrangement between a filter leaf such as shown in Fig. 2 and associated inlet and outlet ducts;

Figure 9:
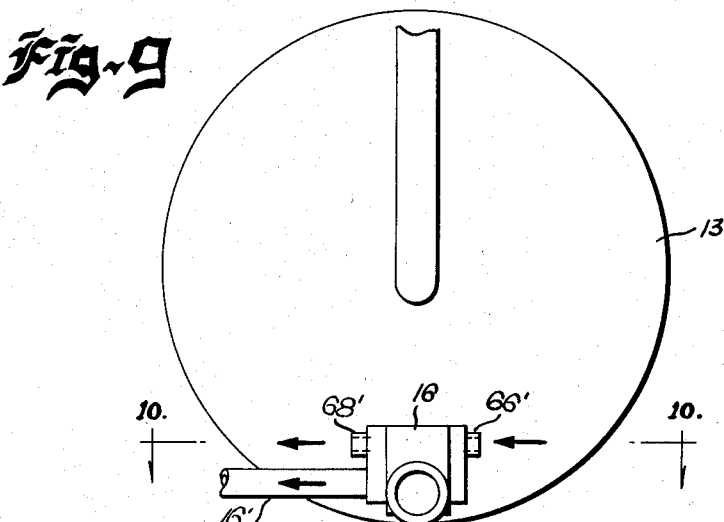
Fig. 9 is a view of the right hand end of the filter as viewed in Fig. 1.

Referring now to the drawings, and particularly to Fig. 1 thereof, there is shown a filter 10 comprising a horizontally disposed tank 11 defining therein a filter chamber 12. The chamber 12 is sealed from the atmosphere by means of a cover 13 which is adapted to be sealably connected over the open end of the tank 11. A pair of filter leaf support beams 14 are secured at the respective ends thereof to the inner side of the cover 13 and are further supported above the bottom of the tank 11 by means of suitable wheels 15 which are adapted to roll on the bottom of the tank 11.

Figure 11:
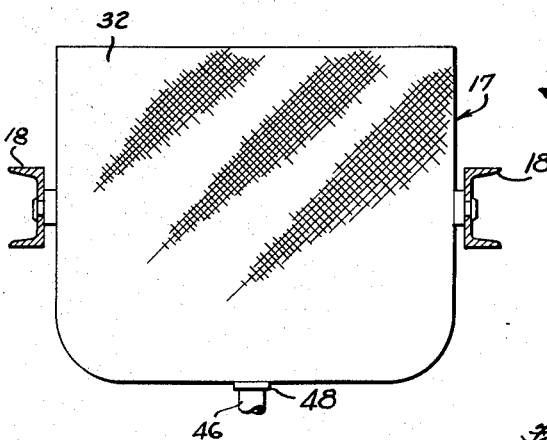
Fig. 11 is a sectional view taken along the line 11—11 of Fig. 1.

An outlet manifold 16 is supported between the beams 14, and a plurality of hollow filter leaves 17 are contiguously mounted along the manifold 16 and hydraulically connected thereto. The leaves 17 are maintained in fixed relationship with respect to one another and with respect to the walls of the tank 11 by means of a pair of guide arms 18 which as best shown in Fig. 11 extend along opposite sides of the filter leaves 17 about midway between the tops and bottoms thereof and are suitably secured to the door 13 and to the support beam 14.

In order to admit the vegetable oil to be processed into the chamber 12, an inlet port 21 is provided near the top of the tank 11 and the oil to be winterized is pumped into the chamber 12 through this duct. Preferably, the oil is at least partially cooled before being pumped through the duct 21 into the chamber 12, and it is further cooled or maintained at the desired 55° F. temperature value by means of a suitable cooling jacket 22 which surrounds the tank 11. With the vegetable oil in this chilled state, the stearin congeals or solidifies so that as the mixture of stearin and oil is forced against the porous surfaces of the filter leaves 17, the pure oil may pass through the pores in the leaves and thus into the outlet manifold 16 but at least some of the solidified stearin does not pass through these pores and therefore collects on the outer surfaces of the leaves 17. A cake of stearin is thus formed on the surfaces of each leaf 17 which prevents the passage of any additional stearin through the leaf. The cake of stearin thus provides a precoat layer which may be built up on the leaf by recirculating the oil through the filter at the beginning of a filtering cycle.

After a suitably thick precoat cake has been built up so that no stearin passes therethrough, an outlet line 16' from the effluent manifold 16 is connected to a suitable reservoir and the filter is in normal operation. Thereafter, when a stearin cake of predetermined thickness has been built up on the outer surfaces of the filter leaves 17, it should be removed. Accordingly, the supply of vegetable oil to the filter chamber 12 is interrupted by suitable means, either automatically or manually, while pressurized air is supplied thereto through a suitable port 26. This operation is termed "blow down" and forces any of the oil which has been trapped in the stearin cake through the leaves 17 and into the manifold 16. Thereafter, the supply of pressurized air is terminated and any of the oil which remains in the chamber 12 is drained through a suitable drain port 23. In order to minimize the amount of oil which must be drained from the chamber 12 each time that the filter leaves 17 are cleaned, the filter leaves 17 are disposed very closely together as well as very closely to the adjoining surfaces of the tank 11. Consequently, there is very little unoccupied space in the filter chamber 12 to hold the oil which must be drained at this time.

After the chamber 12 has thus been emptied, the door 13 is opened by moving it horizontally to the right as viewed in Fig. 1. This is readily accomplished since the door 13 is supported on a carriage 24 which rolls on a horizontally disposed track 25 that extends parallel to the bottom surface of the tank 11 on which the wheels 15 roll. Since the beams 14 as well as the manifold 16 are secured to the cover 13, as the cover is moved toward the right filter leaves 17 are withdrawn from the tank 11. Prior to the removal of the leaves from the tank 11 in this manner, a suitable container (not shown) is disposed outside of the opening in the tank 11 so that when the filter leaves 17 are removed from the chamber 12, they are positioned above the container. With the filter elements thus removed from the tank 11 and positioned over the container, a heating fluid, such, for example, as steam or hot water, is pumped through the cores of the filter leaves 17, thereby to elevate the respective temperatures thereof so as to melt the stearin which is caked on the surfaces of the filter leaves 17. When the stearin melts, the cakes slide down and drop off the filter leaves and into the container. Since the filter cakes which are built up on the filter leaves 17 are substantially pure stearin, this cleaning process is effective to provide a substantially perfect cleaning process, absolutely all of the filter cake being removed from the filter leaves 17 in each cleaning operation.

As soon as all of the stearin has thus been removed from the filter leaves 17, the supply of heating fluid to the filter leaves is terminated and a cooling fluid is forced therethrough so as to reduce the temperature of the filter leaves 17 to at least the 55° F. value. Therefore, when the filter leaves 17 are again returned to the filter they do not heat the vegetable oil and thus liquify any of the previously solidified stearin. It will be apparent that even with relatively large filters, if the mass of the individual filter elements is kept low this entire cleaning operation may be accomplished in a manner of a few minutes, since the heating and cooling periods may be very short. Moreover, no damage is done to the filter leaves themselves or to the other portions of the filter by the cleaning, and none of the stearin, which is in itself very valuable, is lost. By virtue of the fact that there is no chance of damage to the filter leaves as a result of the cleaning operation, when the filter 10 is once more cut into the line, there is no chance that any unfiltered oil will seep through the filter leaves 17 into the outlet manifold 16.

Having in mind the overall operation of the filter 10 to remove stearin from vegetable oil by a winterizing process, reference is now made to Figs. 2-6 for a detailed consideration of a filter leaf 17 embodying the present invention. All of the filter leaves 17 in the filter 10 are identical, and therefore, a description of one will suffice for all. The filter leaf 17, as shown in Fig. 2, includes as its principal supporting member a metallic core 32 which, as shown in Fig. 6, is a metallic sheet 33 having a plurality of punched out, loop portions 34 which are arranged on the sheet 33 in a plurality of parallel rows 35 so as to provide a plurality of parallel tubular flutes 36. The core 32 may thus be defined as a tubularly slit screen in which adjacent ones of the loops 34 in each row are pressed out of the sheet 33 and upset in opposite directions.

In order to prevent the leaves 17 from flexing during use and thereby causing some of the stearin to be dislodged therefrom as well as to prevent one leaf from contacting another, it is very important that the leaves 17 be stiff. However, as mentioned above, it is very important that the mass of the leaves 17 be low so as to minimize the cleaning time of the filter. The provision of the loops 34 and thus the flutes 36 provide stiffening ribs for the metal sheet 33 which prevent bending or flexing of the leaf and, in addition, the mass of the leaf is very low since the sheet 33 may be very thin.

The core 32 is held by a supporting frame and drain channel 37 which is key-hole shaped in cross section and is, as best shown in Figs. 4 and 5, secured as by a plurality of rivets 38 to the periphery of the core 32. Preferably, the channel 37 is uniform in cross section throughout its length and engages the core 32 at the locations of the loops 34.

In order to provide a porous framework across the surface of which the filter cake may build up, the core 32 and the frame 37 are enclosed within a finely woven fabric bag 44 which fits very snugly over this supporting structure. The bag 44, as best shown in Fig. 7, has, at the bottom center thereof, a necked-down portion 45 which surrounds a connector nozzle 46. Initially, the top of the bag 44 is open, but after it has been placed on a leaf core 32 the top of the bag is sewn closed. Preferably, a chain stitch is used for this purpose to facilitate later removal of the bag 44 from the core 32. The nozzle 46 depends from the bottom center of the frame 37, and a seal is provided between the neck 45 and the nozzle 46 by means of an annular aviation type clamp 48 or the like which surrounds the neck 45 and clamps it against a resilient ring 47 mounted in a suitable annular groove in the external wall of the nozzle 46. The nozzle has a central bore 49 connecting with the channel in the frame 37 so that the effluent which flows through the bag 44 and into the drain channel in the frame 37 may pass into the effluent outlet manifold 16.

As best shown in Fig. 7, the effluent outlet manifold 16 comprises a pair of channels 51 and 52 which are welded together in face-to-face relationship, and the leaves 17 are supported thereon and hydraulically connected thereto by a plurality of spatially disposed connector sleeves 53 which are respectively mounted in suitable apertures in the top of the manifold 16. The sleeves 53 are disposed at the desired locations of the filter leaves 17, and the nozzles 46 respectively depend into the sleeves 53. Each nozzle 46 has a lower portion 54 of reduced diameter which fits into the associated sleeve 53 and which terminates in a shoulder 57. The associated filter leaf 17 is thus supported by the shoulder 57 resting on the upper end of the sleeve 53. A resilient O-ring 56 which is partially received in an annular groove 55 in the nozzle 46 seals the nozzle 46 to the sleeve 53.

When desired, although with the filter leaves of the present invention it would ordinarily be necessary, a foraminated, cup-shaped trap 58 may be interconnected between each nozzle 46 and the outlet manifold 16 to filter out any stearin which might leak through the leaf 17 in the event of a failure. As shown, the trap 58 has an external lip 61 at the top thereof which rests on a reentrant annular flange 62 on the bottom of the sleeve 53. A resilient O-ring 63 seats on top of the lip 61 and is partially compressed when the leaf 17 is supported on the sleeve 53 to insure a tight fit between the lip 61 and the flange 62.

In order to control the temperature of the filter leaf 17, a heat conducting tube 59, which is formed of a plurality of U-shaped sections connected end-to-end to comprise a complete circuit, is mounted in a tortuous path on the core 32. As shown in Fig. 2, the flutes 36 are horizontally disposed and the tube 59 extends through spaced apart ones of the flutes 36. Consequently, during operation of the filter 10, the effluent may flow horizontally above the tube sections 59 and into the vertical drain channels in the frame 37.

In order to insure a rapid and complete removal of the stearin cake during the cleaning operation, the flutes 36 and thus the principal portions of the tube 59 extend horizontally across the leaf. Because of this disposition of the tube 59, the cake, which is particularly loosened from the leaf in the vicinity of the sections of the tube 59, slides, in its entirety, from the faces of the leaf, irrespective of possible "cool spots" between the tube sections. Since the horizontal disposition of the tube sections reduces the flow rate through the leaf, in other applications where a high flow rate is desired, the flutes 36 may be vertically disposed. However, in the "winterizing process" for vegetable oil, the flow rate is so low that it is not a factor to be considered and, therefore, the horizontal disposition of the tube sections is desirable.

Figure 10:
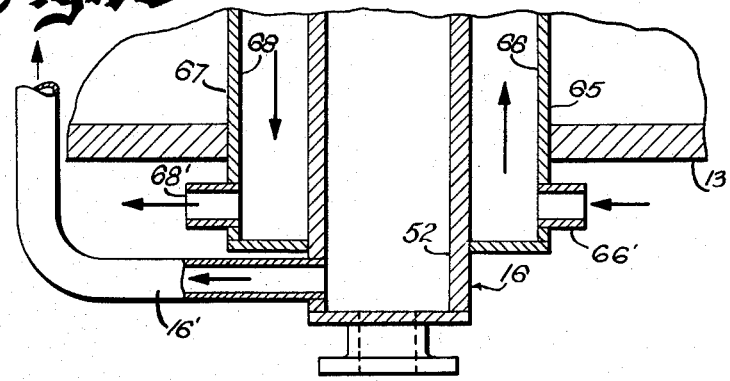
Fig. 10 is a sectional view taken along the line 10—10 of Fig. 9.

In order to supply the temperature controlling liquid to the tube 59, a channel member 65 is welded along one side of the effluent outlet manifold 16 to provide a temperature control inlet manifold 66 and a similar channel member 67 is welded to the opposite side of the outlet manifold 16 to provide a temperature control outlet manifold 68. The nozzle 46 is provided with a hole 71 which is drilled along one side of the bore 48, but not connected thereto, and which communicates with a transverse hole 72 into which is threaded a conventional pipe fitting 73. The fitting 73 is connected through a flexible coupling 74 and a threaded nipple 75 to the manifold 66. The outlet manifold 68 is connected through a similar pipe fitting 77, flexible connector 78, and nipple 81 to a hole 82 drilled in the nozzle 46 adjacent to the bore 49 but out of communication therewith. One end 83 of the tube 59 extends into the hole 71, the other end 84 of the tube 59 extends into the hole 82, and both ends are suitably welded, as by silver solder, to the nozzle 46. Therefore, when a fluid is pumped into the inlet manifold 66 through an inlet connection 66' which, as best shown in Figs. 9 and 10 is mounted just outside of the cover 13, it passes up through the flexible connection 74, through the nozzle 46 and into the end portion 83 of the tubing 59. The fluid thus passes through a substantial portion of the core 32 and out through the end portion 84, the nozzle 46, the flexible connector 78, and into the outlet manifold 68 and out through a connection 68'. Therefore, if a hot liquid is forced into the inlet manifold 66, the leaf 17 will be heated, while if a cool liquid is passed into the inlet manifold 66 the leaf 17 will be cooled.

Refer now to Fig. 8 wherein is shown another connector arrangement for interconnecting the manifolds 16, 66, and 68 to a filter leaf. In this embodiment of the invention, the leaf is essentially the same as that shown in Fig. 2 but in place of the nozzle 46 comprises a connector nozzle 90. The nozzle 90 has a lower portion 91 of reduced diameter which fits into a respective connector sleeve 92 in the top of the manifold 16. The sleeve 92 is provided with a transverse inlet port 93 near the top thereof and a transverse outlet port 94 somewhat below the port 93. The pipe fitting 73 is threaded into the port 93 to connect it to the inlet manifold 66 and the pipe fitting 81 is threaded into the port 94 to connect it to the outlet manifold 68.

In order to connect the ports 93 and 94 to the temperature control tube 59, the nozzle 90 is provided with respective transverse passageways 95 and 96 which are disposed for alignment with the ports 93 and 94 and the ends of the tube 59. The end portions of the tube 59 extend through the central bore 97 of the nozzle 90 and are fitted into the passageways 95 and 96 and brazed to the nozzle 90. Leakage of the temperature control fluid from one passageway 95 to the other passageway 96 is prevented by an O-ring 101 which is partially received in an annular groove 102 disposed in the nozzle 90 between the passageways 93 and 94. A similar O-ring 103 prevents leakage of the temperature control fluid into the effluent, and an O-ring 104 prevents leakage of the temperature control fluid into the filter chamber. In order to facilitate alignment of the ports 93 and 94 with the ports 95 and 96, a suitable key and keyway may be provided or annular grooves (not shown) may be provided in the nozzle 90 between the O-rings 101, 103, and 104.

The connector arrangement illustrated in Fig. 8 has the advantage that a filter leaf may be removed from the manifold 16 without first removing the flexible temperature control connections. Since the usual filters used in a winterizing process have of the order of fifty filter leaves, the arrangement of Fig. 8 obviates the necessity of opening one hundred connections whenever a complete overall of the filter is performed.

The present invention thus provides a filter leaf which is light in weight, inexpensive to manufacture, and yet very rigid both in regard to bending and compression. While rigidity as to bending might be provided by means of auxiliary stiffening ribs, a very important factor which cannot be provided by such ribs is the compressibility of the leaf. The tubularly slit core 32 of the present invention is substantially non-compressible, so that a gradual build-up of pressure across the leaf cannot compress the core. Should the core even slightly compress under these conditions, the cake may crack, thus permitting the fine particles of stearin to pass through the leaf and thus contaminate the effluent. Similarly, the core cannot compress during the "blow-down" operation which could also permit some of the stearin to pass through the filter leaf.

While particular embodiments of the invention have been shown, it will be understood, of course, that it is not desired that the invention be limited thereto since modifications may be made, and it is, therefore, contemplated by the appended claims to cover any such

Having thus described the invention, what is claimed as new and desired to be secured by Letters Patent of the United States is:

1. A filter for use in removing stearin from vegetable oil comprising means defining a filter chamber, an inlet duct to said chamber, an outlet manifold extending into said chamber, a plurality of filter leaves mounted in said chamber and having the effluent outlets thereof connected to said manifold, each of said filter leaves comprising a rigid, unitary, metal core, a heat conducting tube secured to said core adjacent the surface thereof, and a porous, flexible covering member enclosing said core and said tube, both ends of said tube effectively extending outside of said covering member and out of communication with both said chamber and said outlet manifold.

2. A filter for use in removing stearin from vegetable oil comprising means defining a filter chamber, an inlet duct to said chamber, an outlet manifold extending into said chamber, a plurality of filter leaves mounted in said chamber and having the outlets thereof connected to said manifold, each of said filter leaves comprising a rigid, tubularly slit heat conducting screen, a heat conducting tube secured to said screen along a tortuous path adjacent both surfaces thereof, and a porous, flexible covering member enclosing said screen and said tube, both ends of said tube effectively extending outside of said covering member and out of communication with both said chamber and said outlet manifold.

3. A filter leaf comprising, a metallic sheet having a plurality of struck-out portions forming loops, said loops being arranged in a plurality of rows and columns, adjacent ones of said struck-out portions in said rows protruding from opposite sides of said sheet to form parallel passageways through said sheet at the location of said rows and to form channels on opposite faces of said sheet between adjacent ones of said rows, and a tubular heat conducting member extending through said passageways in a plurality of widely spaced ones of said rows.

4. In a filter, the combination of plurality of filter leaves each having an effluent outlet, an effluent outlet manifold, relatively rigid connector means for mounting said leaves on said manifold and for connecting said effluent outlet to said manifold, each of said leaves including fluid operated means for controlling the temperature of the leaf, said fluid operated means each including a fluid inlet and a fluid outlet, a fluid inlet manifold and a fluid outlet manifold, and a plurality of flexible connectors respectively connected between the fluid inlets of said leaves and said fluid inlet manifold and between the fluid outlets of said leaves and said fluid outlet manifold.

5. A filter leaf comprising a unitary, rigid plate having a plurality of struck out portions on a face thereof, said plate being deformed to provide a plurality of parallel channels on the opposite faces thereof, a tubular heat conducting member extending along said face of said plate, said struck out portions at least partially overlying said tubular member to secure it to said plate, and a porous, flexible filter medium substantially enclosing said plate and said tubular member.

6. In a filter, the combination of a plurality of filter leaves each having an effluent outlet, and a temperature control means including a fluid inlet and a fluid outlet; an effluent outlet manifold; a temperature control fluid inlet manifold; a temperature control fluid outlet manifold; and a plurality of means respectively connecting the inlet and outlets of each of said leaves to corresponding ones of said manifolds, said last mentioned means each comprising a tubular connector fixedly secured to and extending into said effluent outlet manifold, a tubular nozzle secured to the associated leaf and telescopically fitted into said connector, said nozzle being connected to said effluent outlet of said leaf for conveying the effluent to said effluent outlet manifold, a pair of radial passageways extending through the wall of said connector externally of said manifold, a pair of radial passageways extending through the wall of said nozzle in respective communication with said passageways in said connector, means disposed within said nozzle connecting said passageways in said nozzle with said fluid inlet and fluid outlet of said temperature control means, and fluid sealing means interposed between said connector and said nozzle for sealing the passageways in said nozzle from one another.

7. The combination set forth in claim 6 wherein said passageways in said connector and said nozzle are axially displaced along the respective members, and said sealing means comprises a resilient O-ring surrounding said nozzle and interposed between the inlet and outlet passageways.

8. The combination set forth in claim 7 which further comprises abutments respectively disposed on said nozzle and said connector for causing alignment of the respective inlet and outlet passageways when said abutments are in mutual engagement.

9. In a filter, a plurality of temperature controlled filter leaves each comprising an effluent outlet, a temperature control fluid inlet and a temperature control fluid outlet, a single nozzle mounted on said leaf, three mutually exclusive passageways respectively connected to said inlet and outlets and extending through said nozzle, three fluid carrying manifolds, connector means in one of said manifolds for receiving said nozzles to support said leaves, and means operatively connected with said nozzle only when said nozzles are received in said connector means for connecting said three passageways to respective ones of said three manifolds.

10. A filter useful for removing entrained solids from a liquid carrier, said solids having a melting point substantially higher than that of the liquid carrier, comprising a tank enclosing a filter chamber, an inlet port for supplying the liquid to be filtered to said chamber, an outlet duct for conveying the filtered liquid away from said chamber, a plurality of hollow, perforate filter leaves mounted on said duct and having effluent outlets connected to said duct, support means for mounting said duct and said filter leaves in said chamber for removal of said duct and said leaves from said chamber as a unit, each of said filter leaves comprising a rigid, tubularly slit heat conducting screen, means for selectively raising and lowering the temperature of said leaves above and below the melting point of said solids so that said solids are not melted by said leaves when the temperature thereof is less than said melting point and said solids are thus deposited on said leaves and said solids which are collected on said leaves are later melted during a leaf cleaning operation when the temperature of said leaves exceeds said melting point, said means including a plurality of heat conducting tubes respectively secured to said screens along a tortuous path, each said tube winding back and forth through adjacent slits in the associated screen thereby to be disposed adjacent both surfaces of said screen, a first conduit mounted on said support means and connected to one end of each of said tubes for supplying a temperature controlling fluid thereto, and a second conduit mounted on said support means and connected to the other ends of said tubes for conveying said fluid away from said leaves, said first and second conduits also being removable from said chamber as a unit with said leaves.

11. A filter leaf useful, for example, in removing stearin from vegetable oil, comprising a rigid heat conducting screen having a plurality of parallel slits arranged in rows and columns therein, adjacent ones of said slits disposed in said rows being in substantially side by side relationship and the slits in adjacent rows being arranged in substantially end to end relationship, the portions of said screens between adjacent slits in each of said rows being upset with adjacent ones of said portions being upset in opposite directions thereby to provide a passageway at the location of each of said rows and to provide channels on both surfaces of said screen between adjacent ones of said rows, a heat conducting tube formed in a tortuous path and extending through at least some of said passageways in said rows whereby adjacent portions of said tube provide opposite surface portions of said filter leaf, and a porous filtering member enclosing said screen and said tube with the end portions of said tube extending outside of said filtering medium, a peripheral frame to which said screen is secured and an effluent outlet duct from said frame.

12. A filter leaf as set forth in claim 11 wherein the effluent outlet duct constitutes a tubular member, the end portions of said tube extend into said tubular member, and means for utilizing said tubular member to mount said leaf in a filter chamber.

References Cited in the file of this patent

UNITED STATES PATENTS

| | | |
|---|---|---|
| 434,831 | Kleemann | Aug. 19, 1890 |
| 444,733 | Stockheim | Jan. 13, 1891 |
| 586,593 | Chamberlain | July 20, 1897 |
| 2,392,354 | Alsop | Jan. 8, 1946 |
| 2,435,115 | Alsop | Jan. 27, 1948 |
| 2,821,305 | Anderson | Jan. 28, 1958 |

FOREIGN PATENTS

| | | |
|---|---|---|
| 539,460 | Italy | Feb. 13, 1956 |
| 655,385 | Great Britain | July 18, 1951 |
| 1,087,301 | France | Aug. 25, 1954 |